United States Patent
Chu et al.

(10) Patent No.: US 7,590,876 B2
(45) Date of Patent: Sep. 15, 2009

(54) METHOD FOR ADJUSTING A FREQUENCY WORKING BETWEEN A NORTH BRIDGE CHIP AND A RANDOM ACCESS MEMORY OF A COMPUTER SYSTEM

(75) Inventors: Hsiu-Ming Chu, Taipei (TW); Kuang-Jui Ho, Taipei (TW); Ruei-Ling Lin, Taipei (TW)

(73) Assignee: Via Technologies, Inc., Shindian, Taipei (TW)

( * ) Notice: Subject to any disclaimer, the term of this patent is extended or adjusted under 35 U.S.C. 154(b) by 510 days.

(21) Appl. No.: 11/432,215

(22) Filed: May 11, 2006

(65) Prior Publication Data

US 2006/0259801 A1    Nov. 16, 2006

(30) Foreign Application Priority Data

May 13, 2005    (TW) ............................... 94115649 A

(51) Int. Cl.
*G06F 1/00* (2006.01)
*G06F 1/32* (2006.01)

(52) U.S. Cl. ........................ 713/322; 713/300; 713/320
(58) Field of Classification Search ................ 713/300, 713/320, 322, 600
See application file for complete search history.

(56) References Cited

U.S. PATENT DOCUMENTS

| | | | |
|---|---|---|---|
| 6,583,785 B2 * | 6/2003 | Yeh | 345/204 |
| 6,763,478 B1 | 7/2004 | Bui | |
| 7,003,658 B2 * | 2/2006 | Chen | 713/2 |
| 7,444,490 B2 * | 10/2008 | Cases et al. | 711/167 |
| 2004/0148528 A1 * | 7/2004 | Silvester | 713/300 |
| 2006/0161375 A1 * | 7/2006 | Duberstein et al. | 702/132 |

FOREIGN PATENT DOCUMENTS

CN    1501463    6/2004

* cited by examiner

*Primary Examiner*—Suresh K Suryawanshi
(74) *Attorney, Agent, or Firm*—Kirton & McConkie; Evan R. Witt

(57) ABSTRACT

A frequency working between the north bridge chip and random access memory of a computer system is dynamically and automatically adjusted in response to the frequency change of the CPU, in response to the workload of the north bridge chip or in response to the change of settings in a software program. The computer system may need to perform POST (Power-On Self Test) of BIOS to detect and calibrate the adjusted frequency.

19 Claims, 4 Drawing Sheets

METHOD FOR ADJUSTING A FREQUENCY WORKING BETWEEN A NORTH BRIDGE CHIP AND A RANDOM ACCESS MEMORY OF A COMPUTER SYSTEM

FIELD OF THE INVENTION

The present invention relates to a frequency adjusting method, and more particularly to a method for adjusting the frequency working between the north bridge chip and random access memory.

BACKGROUND OF THE INVENTION

A commercially available motherboard of a computer system mainly consists of a central processing unit (CPU), a chipset and some peripheral circuitry. CPU is the core of the computer system in charge of the coordination among parts of the computer system and doing logic operations as well. The composition of a chipset can be various, and a chipset composed of a north bridge chip and a south bridge chip is the main stream in current market. The north bridge chip and the south bridge chip are assigned with different tasks. In principle, the north bridge (NB) chip takes charge of the high-speed-bus associated parts on the motherboard while the south bridge (SB) chip deals with low-speed bus communication in the system.

The north bridge chip communicates with the CPU via a front side bus (FSB), and in addition, the north bridge chip is coupled to an Accelerated Graphics Port (AGP) interface via an AGP bus and further coupled to a random access memory (RAM) via a memory bus. The south bridge chip is coupled to a peripheral component interconnect (PCI) interface via a PCI bus, and further coupled to other devices such as industry standard architecture (ISA) interface, integrated drive electronics interface, universal serial bus (USB) interface, keyboard and mouse. Chipset takes charge of communication of the CPU with the peripheral equipment, including access to RAM. Signals or commands to be read or executed in the computer system need be processed by CPU and temporarily stored in RAM via the north bridge chip of the chipset.

The north bridge chip comprises a CPU controller in communication with the CPU, a memory controller in communication with the RAM, an Accelerated Graphics Port (AGP) controller in communication with an AGP interface, and a SB controller in communication with the south bridge chip. The data are written, read or refreshed by accessing to the RAM entry by entry, so the data flow should be well ordered by the memory controller. Furthermore, the requests issued by various peripheral devices for access to the RAM are directed by a traffic controller disposed in the north bridge chip.

With the advance of processing performance of computer systems, the processing capacity, speed and frequency are getting higher and higher, and the kinds and amount of data that the computer system needs to process are getting more and more. When there are lots of data to be processed at the same time, the data transfer burden of the north bridge chip would be huge, and thus high heat of the north bridge chip and power consumption of the computer system are inevitable. Nevertheless, for supporting a majority of workload, high-speed and high-frequency processing specifications are still adopted. In other words, high-speed and high-frequency processing of the north bridge chip is still performed even if the data or signals to be processed by the north bridge chip decreases (for example when CPU throttling is enabled to reduce frequency). As such, unnecessary power consumption of the computer system and undesired high heat of the north bridge chip occur.

SUMMARY OF THE INVENTION

Therefore, the present invention provides a method for dynamically and automatically adjusting a working frequency of the north bridge chip, thereby reducing power consumption and preventing from overheat.

The present invention relates to a method for adjusting a frequency working between the north bridge chip and random access memory of a computer system, comprising steps of: monitoring a frequency change of the CPU of the computer system after the computer system enters an operating system; and adjusting the frequency working between the north bridge chip and random access memory when the frequency change of the CPU exceeds threshold.

The present invention also relates to a method for adjusting a frequency working between the north bridge chip and random access memory of a computer system, comprising steps of: monitoring a workload index of the north bridge chip after the computer system enters an operating system; and adjusting the frequency working between the north bridge chip and random access memory when the workload index changes to a certain level.

The present invention further relates to a method for adjusting a frequency working between the north bridge chip and random access memory of a computer system, comprising steps of: determining whether a setting of a software program executed by the computer system is changed after the computer system enters an operating system; and adjusting the frequency working between the north bridge chip and random access memory when the setting is changed.

Preferably, the method according to the present invention further comprises steps of: executing a POST procedure to detect and calibrate the operational frequencies of the north bridge chip and random access memory and the phase difference of the operational frequencies after the frequency adjustment; modifying settings of BIOS with the calibration results; and applying the adjusted frequency to the work between the north bridge chip and random access memory.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
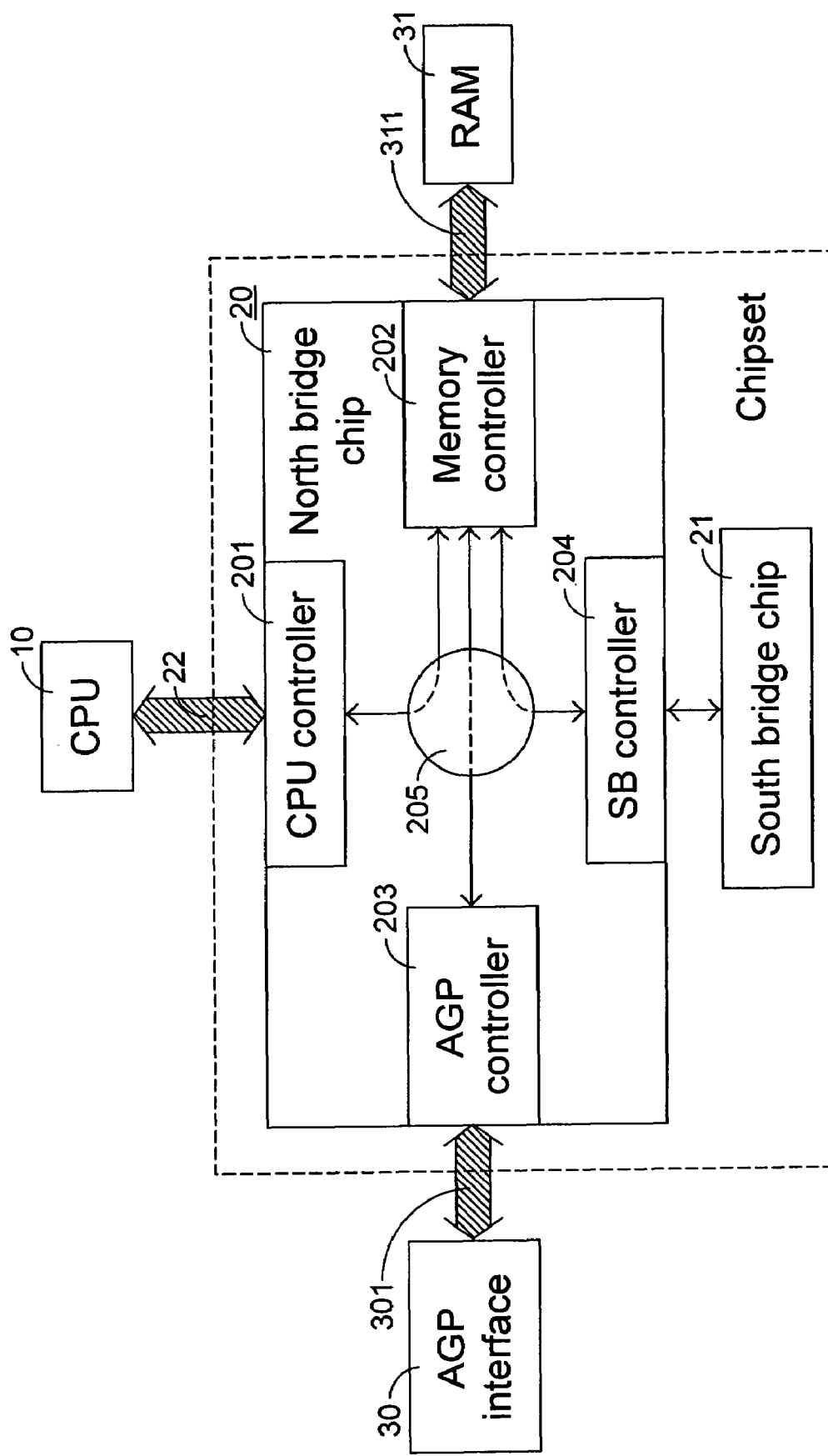
FIG. 1 is a functional block diagram schematically illustrating the work of a typical north bridge chip.

Please refer FIG. 1, in which the work of a north bridge chip is illustrated. A north bridge chip 20 comprises a CPU controller 201 in communication with a CPU 10, a memory controller 202 in communication with a random access memory (RAM) 31, an Accelerated Graphics Port (AGP) controller 203 in communication with an AGP interface 30, and a SB controller 204 in communication with a south bridge chip 21. The present invention conducts adjustment of frequency working between the memory controller 202 of the north bridge chip 20 and the random access memory (RAM) 31 for reducing power consumption when high-frequency processing is not essential or advantageous. Several situations may comply with the frequency-adjustable condition. The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

After the computer system is booted, the computer system enters a POST (Power-On Self Test) stage of BIOS (Basic Input Output System) to detect and calibrate the frequency working between the north bridge chip and RAM and record the associated settings in BIOS. In the POST stage, the BIOS automatically checks the hardware devices in the system according to the initial settings of BIOS. A calibrating operation is performed in the POST stage to calibrate the clock phase of input/output signals among these devices. The calibration, in general, is executed by checking and calibrating delay input and/or input/output of data (DQ) and/or data strobe (DQS) signals. Basically, in this stage, the computer system will detect the initial operational frequencies of the north bridge chip and the RAM and their phase different, and do the phase calibration to make the input and output signals in phase at the timing when the bus is in an idle cycle. The phase calibration assures of correct data access. The calibration results are stored in the BIOS as initial settings. Afterwards, the operating system (OS) is entered, and the calibrated frequency is used for data access to the RAM.

In a first embodiment according to the present invention, the frequency working between the north bridge chip and RAM can be adjusted as the working frequency of CPU changes. When CPU works in a normal condition of a relatively high frequency, a relatively high frequency is also applied for the north bridge chip to access to the RAM. On the contrary, when CPU works in a throttling condition of a relatively low frequency, a relatively low frequency is also applied for the north bridge chip to access to the RAM. For example, when the operational frequency of the CPU changes from 1 GHz to 500 MHz, the operational frequency of the north bridge chip is lowered from DDR 400 MHz to DDR 200 MHz.

The frequency-adjusting method will be described hereinafter with reference to the flowchart of FIG. 2. The operational frequencies of the CPU and the north bridge chip are defined as a first frequency and a second frequency, respectively, and the first and second frequencies are at first and second levels, respectively, when the OS is just entered. (Step 501). Then the operational frequency of the CPU is monitored to see whether the first frequency has changed (Step 502). If the first frequency changes, for example from the relatively high first level to a relatively low third level, the second frequency can also be reduced from the relatively high second level to a relatively low fourth level (Step 503). The fourth level of the second frequency is obtained by coordinating the north bridge chip and the RAM. The operational frequency of the CPU may be reduced in a CPU throttling situation. The CPU throttling situation occurs when the OS has been idle for more than a preset period. Under this circumstance, the operational frequency of the computer system will drop to save power. In other words, the first frequency may change from the first level, e.g. 1 GHz, to the third level, e.g. 500 MHz. Afterwards, another POST procedure is performed with the second frequency at the fourth level (Step 504). Likewise, the operational frequencies of the north bridge chip and RAM and the phase difference therebetween are detected and calibrated once more so as to prevent from data access errors. The calibration results are then stored back to the BIOS as updated settings (Step 505). Subsequently, the CPU and the north bridge chip work with the first frequency at the third level and the second frequency at the fourth level, respectively (Step 506).

Figure 2:
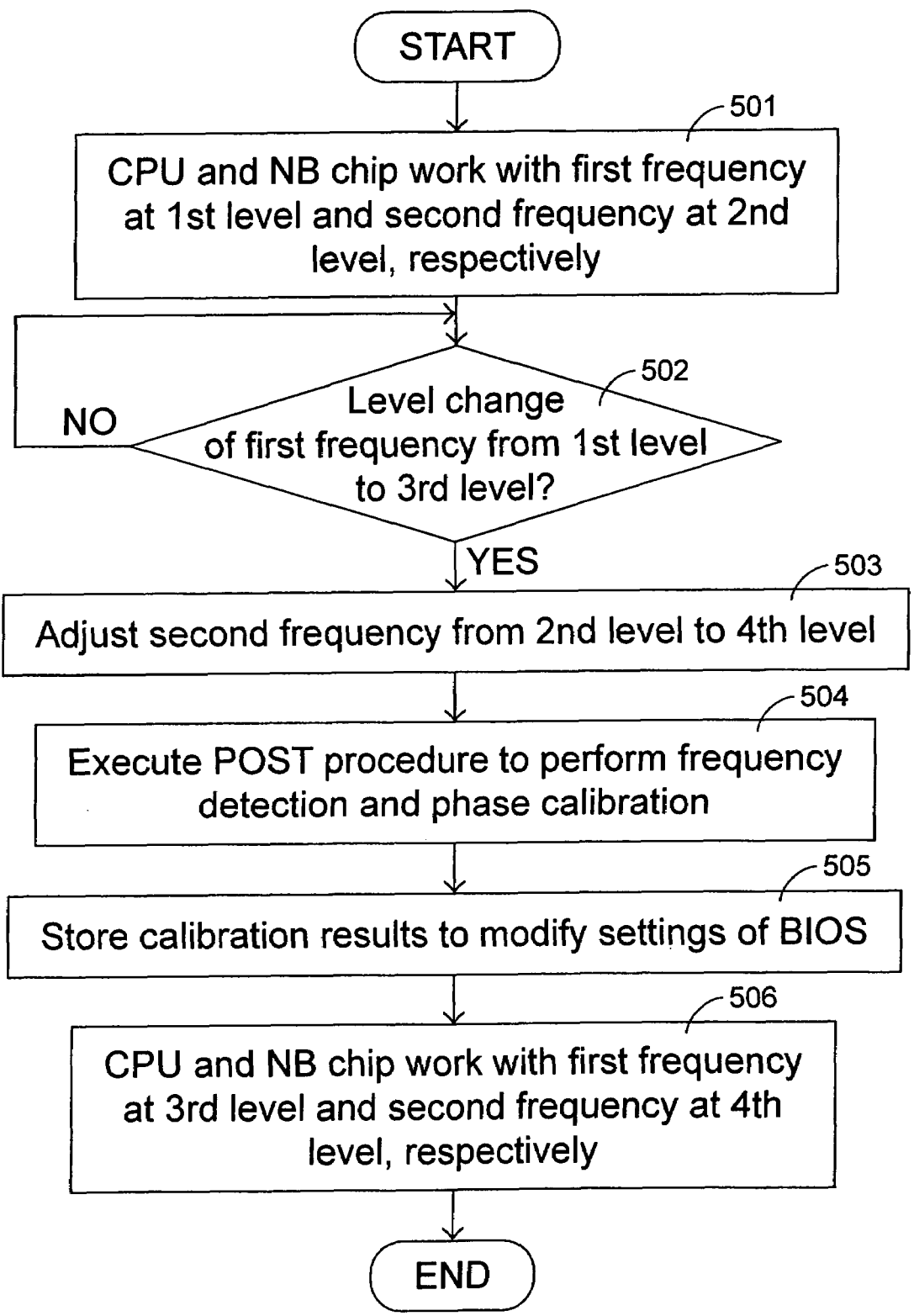
FIG. 2 is a flowchart schematically illustrating a frequency-adjusting method according to a first embodiment of the present invention.

The flowchart of FIG. 2 is also applicable to a reverse process. That is, the frequency adjustment can be performed when the operational frequency of the CPU restores. In this case, the first level of the first frequency and the second level of the second frequency may represent the reduced frequency levels in the CPU throttling situation while the third level of the first frequency and the fourth level of the second frequency represent the normal frequency level in the CPU normal situation. Alternatively, the first level and the third level of the first frequency or the second level and the third level of the second frequency can be two different reduced frequency levels in appropriate cases.

In a second embodiment according to the present invention, the frequency working between the north bridge chip and RAM can be adjusted as the workload of the north bridge chip changes. In an example, the workload of the north bridge chip can be reflected from the heat dissipation of the north bridge chip. The higher the heat dissipation, the higher the workload. Accordingly, a thermo-sensor is disposed inside the computer system for detecting the temperature change around the north bridge chip. As long as the detected temperature does not exceed threshold, the computer system can work with its highest speed and best performance to process data efficiently. On the contrary, if it is realized from the thermo-sensor that overheat occurs, the frequency working between the north bridge chip and RAM will be adjusted to a lower level according to the present invention. In another example, the workload of the north bridge chip can be realized by checking the flow controller in the north bridge chip (e.g. the element 205 in FIG. 1). If the data flow processed by the north bridge chip is very low, i.e. the north bridge chip is in a certain idle state, the frequency can be lowered, for example from DDR 400 MHz to DDR 200 MHz, to reduce power consumption.

Figure 3:
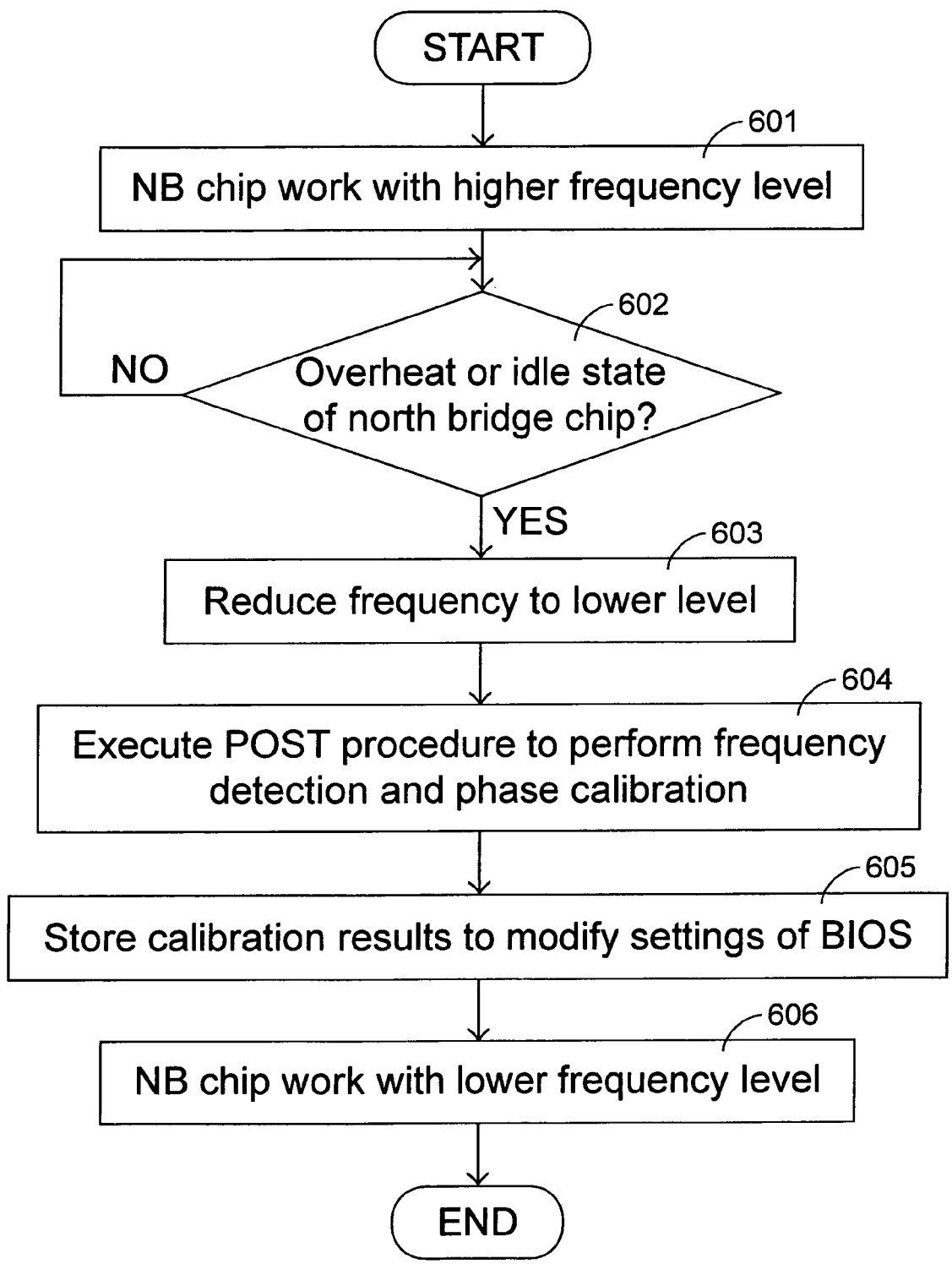
FIG. 3 is a flowchart schematically illustrating a frequency-adjusting method according to a second embodiment of the present invention.

The frequency-adjusting method will be described hereinafter with reference to the flowchart of FIG. 3. The north bridge chip works under a relatively high operational frequency when the OS is just entered. (Step 601). Then the workload of the north bridge chip is monitored to see whether the temperature around the north bridge chip or the data flow processed by the north bridge chip has changed (Step 602). If the workload changes, for example temperature raises or data flow decreases to a certain level, resulting in overheat or idle state, the frequency can also be reduced from the relatively high level to a relatively low level (Step 603). The low level of frequency is obtained by coordinating the north bridge chip and the RAM. Afterwards, a POST procedure is performed with the relatively low level of frequency (Step 604). Likewise, the operational frequencies of the north bridge chip and RAM and the phase difference therebetween are detected and calibrated once more so as to prevent from data access errors. The calibration results are then stored back to the BIOS as updated settings (Step 605). Subsequently, the north bridge chip works with the relatively low level of frequency (Step 606). Likewise, the frequency can restore to a higher level when the overheat condition or the idle state has been removed.

Figure 4:
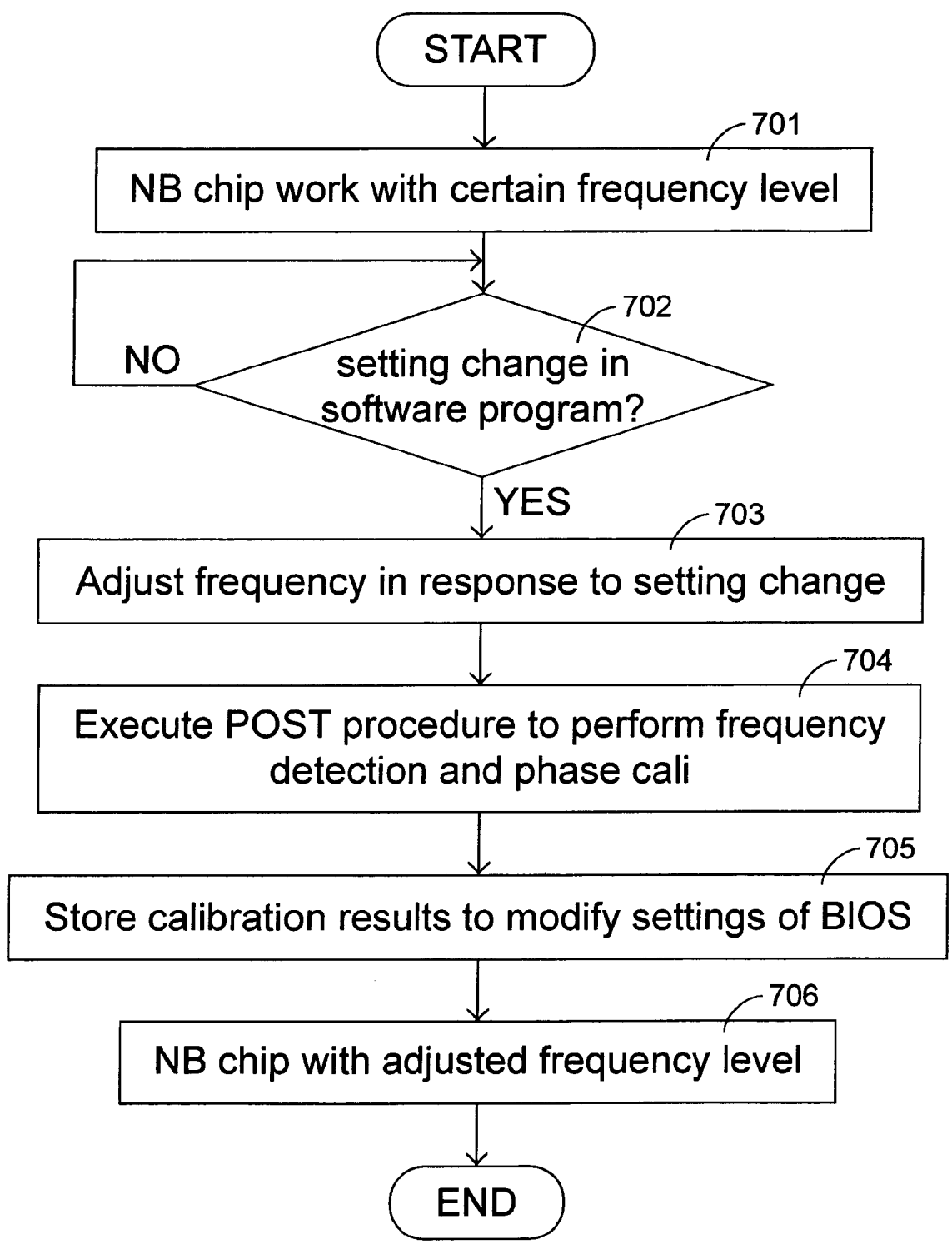
FIG. 4 is a flowchart schematically illustrating a frequency-adjusting method according to a third embodiment of the present invention.

In a third embodiment according to the present invention, the frequency working between the north bridge chip and RAM can be adjusted as one or more settings of a software program executed by the computer system changes. The frequency-adjusting method will be described hereinafter with reference to the flowchart of FIG. 4. The north bridge chip works under a certain operational frequency when the OS is just entered. (Step 701). If the settings of the software program changes (Step 702), the frequency changes accordingly by coordinating the north bridge chip and the RAM (Step 703). Afterwards, a POST procedure is performed with the relatively low level of frequency (Step 704). Likewise, the operational frequencies of the north bridge chip and RAM and the phase difference therebetween are detected and calibrated once more so as to prevent from data access errors. The calibration results are then stored back to the BIOS as updated settings (Step 705). Subsequently, the north bridge chip works with the adjusted frequency (Step 706).

The setting of the software program can be changed by the user. For example, for a portable computer, it is always a big issue to minimize power consumption. Therefore, a portable computer is generally designed with a power inspection software program. The user can change the settings in this software program to modulate the performance of the memory depending on practical requirements, thereby saving power.

It is understood from the above descriptions that the frequency working between the north bridge chip and RAM can be dynamically and automatically adjusted according to some indices so as to minimize power consumption and/or prevent from device damage.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for adjusting a frequency working between a north bridge chip and a random access memory of a computer system, comprising steps of:
   monitoring a frequency change of the CPU of the computer system after the computer system enters an operating system; and
   automatically adjusting the frequency working between the north bridge chip and the random access memory when the frequency change of the CPU exceeds threshold.

2. The method according to claim 1 further comprising steps of:
   executing a POST procedure to detect and calibrate the frequency working between the north bridge chip and the random access memory and a phase difference of the frequency after the frequency adjustment;
   modifying settings of BIOS with the calibration results; and
   applying the adjusted frequency to the work between the north bridge chip and the random access memory.

3. The method according to claim 1 wherein the frequency working between the north bridge chip and the random access memory decreases with the decrease of the frequency of the CPU.

4. The method according to claim 3 wherein the frequency of the CPU is decreased for throttling when the computer system has been in an idle state for more than a preset period of time.

5. The method according to claim 4 wherein the frequency of the CPU is increased when the computer system restores from the idle state.

6. The method according to claim 5 wherein the frequency working between the north bridge chip and the random access memory increases with the increase of the frequency of the CPU.

7. A method for adjusting a frequency working between a north bridge chip and a random access memory of a computer system, comprising steps of:
   monitoring a workload index of the north bridge chip after the computer system enters an operating system; and
   automatically adjusting the frequency working between the north bridge chip and the random access memory when the workload index changes to a certain level.

8. The method according to claim 7 further comprising steps of:
   executing a POST procedure to detect and calibrate the frequency working between the north bridge chip and the random access memory and a phase difference of the frequency after the frequency adjustment;
   modifying settings of BIOS with the calibration results; and
   applying the adjusted frequency to the work between the north bridge chip and random access memory.

9. The method according to claim 7 wherein said workload index is the temperature detected around the north bridge chip.

10. The method according to claim 9 wherein the frequency working between the north bridge chip and the random access memory is lowered when the temperature detected around the north bridge chip exceeds a threshold.

11. The method according to claim 10 wherein the frequency working between the north bridge chip and the random access memory restores when temperature detected around the north bridge chip restores to a normal level.

12. The method according to claim 7 wherein said workload index is the data flow processed by the north bridge chip.

13. The method according to claim 11 wherein the frequency working between the north bridge chip and the random access memory is lowered when the north bridge chip is in an idle state.

14. The method according to claim 12 wherein the frequency working between the north bridge chip and the random access memory restores when the north bridge chip restores from the idle state.

15. A method for adjusting a frequency working between a north bridge chip and a random access memory of a computer system, comprising steps of:
   determining whether a setting of a software program executed by the computer system is changed after the computer system enters an operating system; and
   dynamically adjusting the frequency working between the north bridge chip and the random access memory according to the setting when the setting is changed.

16. The method according to claim 15 further comprising steps of:
   executing a POST procedure to detect and calibrate the frequency working between the north bridge chip and the random access memory and a phase difference of the frequency after the frequency adjustment;
   modifying settings of BIOS with the calibration results; and applying the adjusted frequency to the work between the north bridge chip and random access memory.

17. The method according to claim 15 wherein the setting of the software program is changeable by the user.

18. The method according to claim 15 wherein the software program is a power inspection software program.

19. The method according to claim 15 wherein the frequency working between the north bridge chip and the random access memory is dynamically adjusted by coordinating the north bridge chip and the random access memory.

* * * * *